US009577276B2

(12) United States Patent
Mitsuta et al.

(10) Patent No.: US 9,577,276 B2
(45) Date of Patent: Feb. 21, 2017

(54) FUEL CELL MEMBRANE ELECTRODE ASSEMBLY

(71) Applicant: HONDA MOTOR CO., LTD., Minato-Ku, Tokyo (JP)

(72) Inventors: Naoki Mitsuta, Nasukarasuyama (JP); Yukihito Tanaka, Saitama (JP); Masashi Sugishita, Utsunomiya (JP); Hiroshi Sohma, Utsunomiya (JP); Kenichi Tanaka, Utsunomiya (JP); Masahiro Fukuta, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 13/927,215

(22) Filed: Jun. 26, 2013

(65) Prior Publication Data

US 2014/0004442 A1    Jan. 2, 2014

(30) Foreign Application Priority Data

Jun. 29, 2012  (JP) ................................ 2012-147503
May 22, 2013  (JP) ................................ 2013-107756

(51) Int. Cl.
*H01M 8/02* (2016.01)
*H01M 8/10* (2016.01)

(52) U.S. Cl.
CPC ......... *H01M 8/1004* (2013.01); *H01M 8/0273* (2013.01); *H01M 8/0276* (2013.01); *H01M 8/0284* (2013.01)

(58) Field of Classification Search
CPC .... H01M 8/10; H01M 8/1004; H01M 8/0273; H01M 8/0276; H01M 8/0284

(Continued)

(56) References Cited

U.S. PATENT DOCUMENTS

2007/0196718 A1*  8/2007  Leistra ............... H01M 8/0276
                                                               429/483
2009/0104507 A1*  4/2009  Ohma .................. H01M 4/881
                                                               429/483

(Continued)

FOREIGN PATENT DOCUMENTS

JP        2007-066766 A    3/2007
JP        2009026528 A     2/2009

(Continued)

OTHER PUBLICATIONS

Office Action and search report dated Mar. 19, 2015 issued over the corresponding Chinese Patent Application No. 201310242830.0 with English translation of pertinent portion.

(Continued)

*Primary Examiner* — Jonathan Jelsma
(74) *Attorney, Agent, or Firm* — Carrier Blackman & Associates, P.C.; Joseph P. Carrier; Fulchand P. Shende

(57) ABSTRACT

A membrane electrode assembly includes an MEA structure unit and a resin frame member. The MEA structure unit includes a cathode, an anode, and a solid polymer electrolyte membrane interposed between the cathode and the anode. The resin frame member is formed around the MEA structure unit, and joined to the MEA structure unit. An adhesive layer is provided between an outer marginal portion of the solid polymer electrolyte membrane extending outward beyond an outer end of a second gas diffusion layer and an inner extension of the resin frame member. The adhesive layer includes an overlapped portion overlapped on an outer marginal end of the second gas diffusion layer.

8 Claims, 17 Drawing Sheets

(58) Field of Classification Search
USPC .......................................................... 429/481
See application file for complete search history.

(56) References Cited

U.S. PATENT DOCUMENTS

| | | | |
|---|---|---|---|
| 2009/0214917 A1* | 8/2009 | Tanahashi ........... | H01M 8/0273 |
| | | | 429/437 |
| 2011/0136038 A1 | 6/2011 | Ishida et al. | |
| 2012/0034542 A1* | 2/2012 | Martin ................ | H01M 8/0273 |
| | | | 429/457 |
| 2013/0183605 A1* | 7/2013 | Tanaka ................ | H01M 8/0273 |
| | | | 429/481 |

FOREIGN PATENT DOCUMENTS

| | | |
|---|---|---|
| JP | 2010-040278 A | 2/2010 |
| JP | 2010123491 A | 6/2010 |
| JP | 2010192392 A | 9/2010 |

OTHER PUBLICATIONS

Office Action dated Sep. 13, 2016 issued over the corresponding Japanese Patent Application No. 2013-107756 with the English translation of pertinent portion.

* cited by examiner

FUEL CELL MEMBRANE ELECTRODE ASSEMBLY

CROSS-REFERENCE TO RELATED APPLICATIONS

This application is based upon and claims the benefit of priority from Japanese Patent Applications No. 2012-147503 filed on Jun. 29, 2012 and No. 2013-107756 filed on May 22, 2013, the contents all of which are incorporated herein by reference.

BACKGROUND OF THE INVENTION

Field of the Invention

The present invention relates to a fuel cell membrane electrode assembly (MEA) having a protection member for different sizes of components of the MEA (stepped MEA).

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) where an anode is provided on one side of the solid polymer electrolyte membrane, and a cathode is provided on the other side of the solid polymer electrolyte membrane. Each of the anode and the cathode includes a catalyst layer (electrode catalyst layer) and a gas diffusion layer (porous carbon).

In the fuel cell, the membrane electrode assembly is sandwiched between separators (bipolar plates). A predetermined number of the fuel cells are stacked together to form a fuel cell stack. For example, the fuel cell stack is mounted in a fuel cell electric vehicle as an in-vehicle fuel cell stack.

In some cases, the membrane electrode assembly has structure where components of the MEA have different sizes, i.e., the surface size of one of diffusion layers is smaller than the surface size of the solid polymer electrolyte membrane, and the surface size of the other of the gas diffusion layers is the same as the surface size of the solid polymer electrolyte membrane (stepped MEA). In this regard, reduction in the thickness of the solid polymer electrolyte membrane is attempted to reduce the amount of relatively expensive material used for the solid polymer electrolyte membrane. Therefore, in order to protect the thin solid polymer electrolyte membrane having insufficient strength, as a protection member, for example, a frame equipped MEA including a resin frame member is adopted.

As the frame equipped MEA, for example a membrane electrode assembly disclosed in Japanese Laid-Open Patent Publication No. 2007-066766 (hereinafter referred to as conventional technique 1) is known. In the membrane electrode assembly, as shown in FIG. 17, an anode catalyst layer 2*a* and an anode diffusion layer 2*b* are provided on one side of a membrane 1, and a cathode catalyst layer 3*a* and a cathode diffusion layer 3*b* are provided on the other side of the membrane 1 to form an MEA 4 having different sizes of components (stepped MEA).

The surface area of the anode diffusion layer 2*b* is larger than the surface area of the cathode diffusion layer 3*b*. The outer end of the membrane 1 where the cathode diffusion layer 3*b* is provided is joined to a gasket structure body 5 through an adhesive layer 6.

SUMMARY OF THE INVENTION

In the above conventional technique 1, an outer corner 3*be* of the cathode diffusion layer 3*b* having a small surface area and an inner end corner 5*a* of the gasket structure body 5 are positioned on the membrane 1. In the structure, when the MEA 4 having the different sizes of components and the gasket structure body 5 are positioned with respect to each other, or when a load is applied to the membrane electrode assembly during operation, the outer corner 3*be* of the cathode diffusion layer 3*b* and the inner end corner 5*a* of the gasket structure body 5 may be pushed into the membrane 1 undesirably. As a result, damages such as reduction in the thickness of the membrane 1 may occur, and the durability of the membrane 1 is deteriorated.

The present invention has been made to solve the problems of this type, and an object of the present invention is to provide a fuel cell membrane electrode assembly in which with simple and economical structure, it is possible to suppress damage of a solid polymer electrolyte membrane suitably.

A fuel cell membrane electrode assembly according to the present invention includes a solid polymer electrolyte membrane, a first electrode provided on one surface of the solid polymer electrolyte membrane, and a second electrode provided on another surface of the solid polymer electrolyte membrane. The first electrode includes a first catalyst layer and a first gas diffusion layer, and the second electrode includes a second catalyst layer and a second gas diffusion layer. A surface size of the first gas diffusion layer is larger than a surface size of the second gas diffusion layer.

In the fuel cell membrane electrode assembly, a frame shaped protection member is formed around an outer marginal portion of the solid polymer electrolyte membrane extending outward beyond an outer end of the second gas diffusion layer. Further, a cushioning member is provided between the outer marginal portion of the solid polymer electrolyte membrane and the protection member, and the cushioning member has an overlapped portion overlapped on an outer marginal end of the second gas diffusion layer.

In the present invention, a cushioning member is interposed between the solid polymer electrolyte membrane and the protection member. In the structure, the inner corner of the protection member and the outer end corner of the second gas diffusion layer do not directly contact the surface of the solid polymer electrolyte membrane. Thus, the inner corner of the protection member and the outer end corner of the second gas diffusion layer are not pushed into the solid polymer electrolyte membrane. Accordingly, with simple and economical structure, it becomes possible to suppress damages of the solid polymer electrolyte membrane suitably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
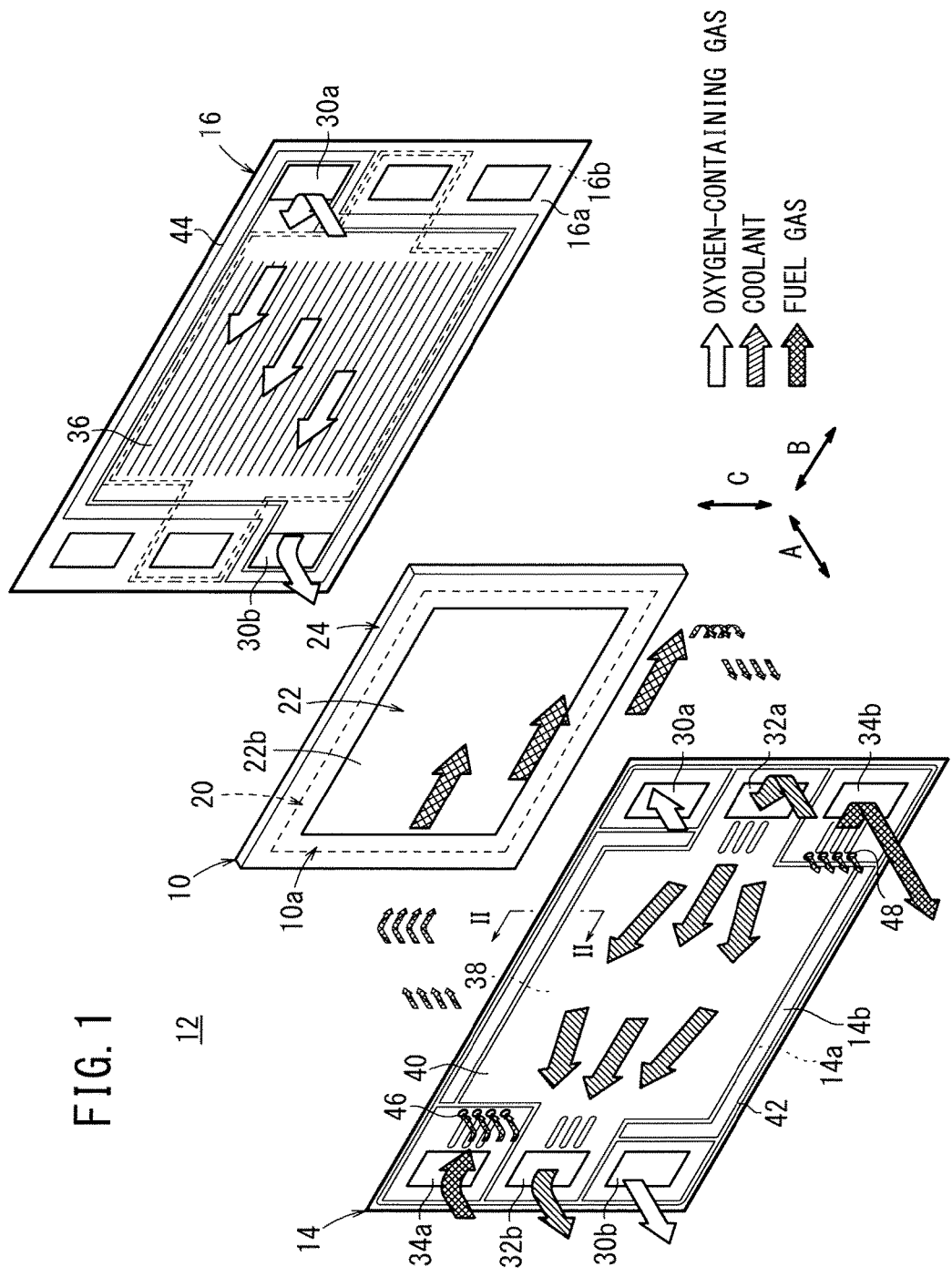
FIG. 1 is an exploded perspective view showing main components of a solid polymer electrolyte fuel cell including a membrane electrode assembly according to a first embodiment of the present invention.
Figure 2:
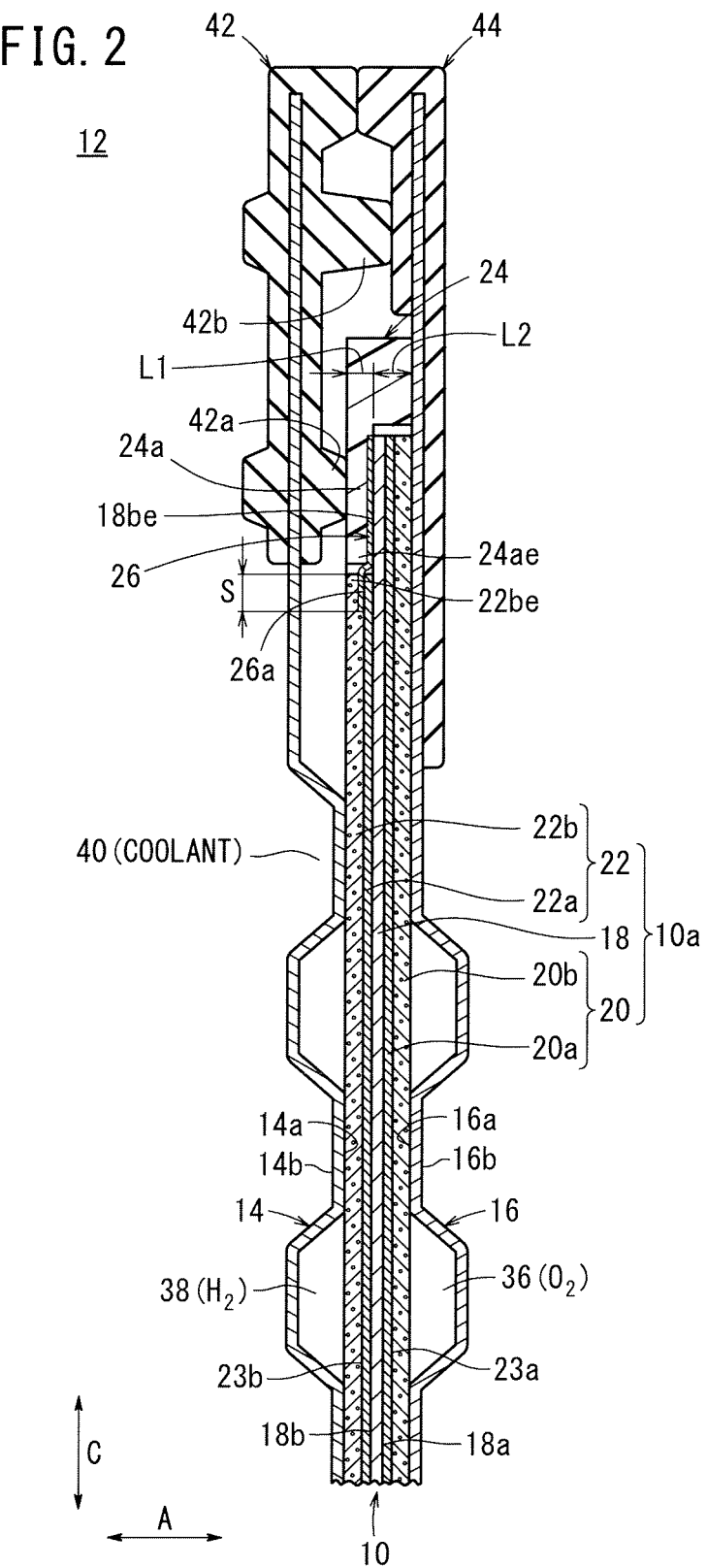
FIG. 2 is a cross sectional view showing the fuel cell, taken along a line II-II in FIG. 1.

As shown in FIGS. 1 and 2, a membrane electrode assembly 10 according to a first embodiment of the present invention is included in a solid polymer electrolyte fuel cell 12, and a plurality of the fuel cells 12 are stacked together in a direction indicated by an arrow A (e.g., in a horizontal direction) to form a fuel cell stack, e.g., mounted in a vehicle.

The fuel cell 12 includes a membrane electrode assembly 10 and a first separator 14 and a second separator 16 sandwiching the membrane electrode assembly 10. For example, the first separator 14 and the second separator 16 are made of metal plates such as steel plates, stainless steel plates, aluminum plates, plated steel sheets, or metal plates having anti-corrosive surfaces by surface treatment. Alternatively, carbon members may be used as the first separator 14 and the second separator 16.

As shown in FIG. 2, the membrane electrode assembly 10 has an MEA structure unit 10a. The MEA structure unit 10a includes a solid polymer electrolyte membrane 18, and a cathode (first electrode) 20 and an anode (second electrode) 22 sandwiching the solid polymer electrolyte membrane 18. The solid polymer electrolyte membrane 18 is formed by impregnating a thin membrane of perfluorosulfonic acid with water, for example. A fluorine based electrolyte may be used as the solid polymer electrolyte membrane 18. Alternatively, an HC (hydrocarbon) based electrolyte may be used as the solid polymer electrolyte membrane 18.

The surface size (surface area) of the anode 22 is smaller than the surface sizes (surface areas) of the solid polymer electrolyte membrane 18 and the cathode 20. The cathode 20 is provided on one surface 18a of the solid polymer electrolyte membrane 18, and the anode 22 is provided on the other surface 18b of the solid polymer electrolyte membrane 18. The solid polymer electrolyte membrane 18 may extend outward beyond the outer end of the cathode 20.

The cathode 20 includes a first electrode catalyst layer (first catalyst layer) 20a joined to the surface 18a of the solid polymer electrolyte membrane 18, and a first gas diffusion layer 20b stacked on the first electrode catalyst layer 20a. The first electrode catalyst layer 20a and the first gas diffusion layer 20b have the same surface size. It should be noted that the surface size of the first electrode catalyst layer 20a may be smaller than the surface size of the first gas diffusion layer 20b.

The anode 22 includes a second electrode catalyst layer (second catalyst layer) 22a joined to the surface 18b of the solid polymer electrolyte membrane 18, and a second gas diffusion layer 22b stacked on the second electrode catalyst layer 22a. The second electrode catalyst layer 22a and the second gas diffusion layer 22b have the same surface size. It should be noted that the surface size of the second electrode catalyst layer 22a may be smaller than the surface size of the second gas diffusion layer 22b, or larger than the surface size of the second gas diffusion layer 22b. In the embodiment, though the surface size of the first electrode catalyst layer 20a is larger than the surface size of the second electrode catalyst layer 22a, the first electrode catalyst layer 20a and the second electrode catalyst layer 22a may have the same surface size.

Each of the first electrode catalyst layer 20a and the second electrode catalyst layer 22a is formed by carbon black supporting platinum particles as catalyst particles. As an ion conductive binder, polymer electrolyte is used. Catalyst paste formed by mixing the catalyst particles uniformly in the solution of this polymer electrolyte is printed, applied, or transferred on both surfaces 18a, 18b of the solid polymer electrolyte membrane 18 to form the first electrode catalyst layer 20a and the second electrode catalyst layer 22a.

The first gas diffusion layer 20b and the second gas diffusion layer 22b are formed by applying respective intermediate layers 23a, 23b containing carbon black and PTFE (polytetrafluoroethylene) particles to carbon paper. Each of the intermediate layers 23a, 23b has the same surface size as the carbon paper. The intermediate layers 23a, 23b may be provided as necessary. The surface size of the first gas diffusion layer 20b is larger than the surface size of the second gas diffusion layer 22b.

As shown in FIGS. 1 and 2, the membrane electrode assembly 10 includes a protection member such as a resin frame member 24 formed around the solid polymer electrolyte membrane 18, and joined to the anode 22 and the cathode 20 for protection of the solid polymer electrolyte membrane 18. For example, the resin frame member 24 is made of PPS (poly phenylene sulfide), PPA (polyphthalamide), PEN (polyethylene naphthalate), PES (polyethersulfone), LCP (liquid crystal polymer), PVDF (polyvinylidene fluoride), a silicone rubber, a fluoro rubber, or an EPDM (ethylene propylene diene monomer) rubber (or ethylene propylene rubber).

The resin frame member 24 has a frame shape, and includes a stepped portion to provide an outermost portion and an inner extension 24a thinner than the outermost portion. The inner extension 24a of the resin frame member 24 protrudes toward the outer end of the anode 22 to contact an outer marginal portion 18*be* of the solid polymer electrolyte membrane 18. The outer marginal portion 18*be* of the solid polymer electrolyte membrane 18 extends beyond the outer end of the second gas diffusion layer 22*b* of the anode 22.

The inner extension 24*a* and the anode 22 have substantially the same thickness L1. The total thickness of the solid polymer electrolyte membrane 18 and the cathode 20 is the same as the thickness L2 of the stepped portion of the resin frame member 24 (thickness calculated by subtracting the thickness L1 of the inner extension 24*a* from the entire thickness of the resin frame member 24).

As a cushioning member, for example, an adhesive layer 26 is provided between the outer marginal portion 18*be* of the solid polymer electrolyte membrane 18 and the inner extension 24*a*. Elastic adhesive is used for the adhesive layer 26. For example, adhesive of thermoplastic resin such as silicone based resin or hot melt adhesive (adhesive which is melted when heated, and which is solidified to gain its adhesive strength when cooled), e.g., in a form of a thermoadhesive sheet is used for the adhesive layer 26.

In the case of adopting adhesive of the thermoplastic resin, in terms of durability, preferably, the adhesive has a melting point of 150° C. or more. Otherwise, at the temperature of 120° C. when the adhesive layer 26 is joined to the solid polymer electrolyte membrane 18, preferably, the adhesive layer 26 is softer than the solid polymer electrolyte membrane 18. It is because, if the adhesive layer 26 is softer than the solid polymer electrolyte membrane 18 when the adhesive layer 26 is joined to the solid polymer electrolyte membrane 18, the adhesive layer 26 is deformed, and it becomes possible to suppress reduction in the thickness of the solid polymer electrolyte membrane 18.

Specifically, for example, a thermo mechanical analyzer (TMA) is used. In this TMA, columnar needles are attached to the solid polymer electrolyte membrane 18 and the adhesive layer 26, respectively such that a predetermined load is applied to the needles. While raising the temperature at a predetermined temperature rising speed, the insertion depths of the columnar needles are detected to measure the softness of the solid polymer electrolyte membrane 18 and the adhesive layer 26 at 120° C. Based on the measurement result, the adhesive layer 26, e.g., having a needle insertion depth which is 1.5 or more times larger than that of the solid polymer electrolyte membrane 18 is adopted.

The thickness of the adhesive layer 26 is set to be equal to or larger than the thickness of the second electrode catalyst layer 22*a*. Preferably, the thickness of the adhesive layer 26 is larger than the thickness of the second electrode catalyst layer 22*a* by 10 μm or more. This is aimed to suppress reduction in the thickness of the solid polymer electrolyte membrane 18 which may be caused, when components of the membrane electrode assembly 10 are heated and joined together, by the other components pushed into the solid polymer electrolyte membrane 18. The thickness of the adhesive layer 26 is larger than the thickness of the second electrode catalyst layer 22*a* by 150 μm or less. This is aimed to suppress the dimension of the fuel cell 12 in the stacking direction so as not to be excessively large.

Preferably, the adhesive layer 26 has electric insulating capability. The cushioning member may be made of adhesive using thermosetting resin. Otherwise, the cushioning member may not have adhesive capability.

Figure 3:
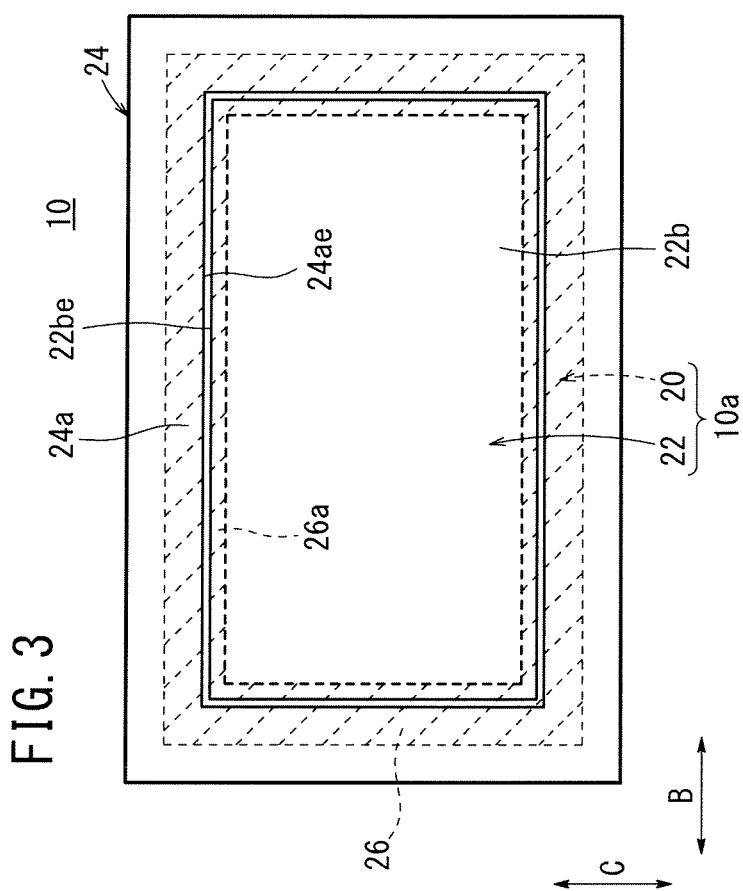
FIG. 3 is a front view of the membrane electrode assembly, showing a side where an anode is provided.

The adhesive layer 26 includes an overlapped portion 26*a* which is overlapped on the outer marginal end of the second gas diffusion layer 22*b* of the anode 22 (portion where the adhesive layer 26 and the outer marginal end of the second gas diffusion layer 22*b* of the anode 22 are overlapped together in the stacking direction). The overlapped portion 26*a* is provided between the second gas diffusion layer 22*b* and the second electrode catalyst layer 22*a*. Alternatively, the overlapped portion 26*a* may be provided between the second gas diffusion layer 22*b* and the intermediate layer 23*b*. As shown in FIG. 3, the adhesive layer 26 has a frame shape in correspondence with the shape of the inner extension 24*a*.

As shown in FIG. 2, the overlapped portion 26*a* has an overlapped length S. The overlapped length S is within a range of 0.2 mm to 3.0 mm. If the overlapped length S is 0.2 mm or more, diffusion of the reactant gas to the end of the anode 22 is suppressed suitably, and sufficient gas barrier performance can be obtained. Therefore, it is possible to prevent the electrode degradation. If the overlapped length S exceeds 3.0 mm, the area where no reaction (power generation) occurs is expanded, and the overall size of the membrane electrode assembly 10 is increased.

As shown in FIG. 1, at one end of the fuel cell 12 in a direction indicated by an arrow B (horizontal direction in FIG. 1), an oxygen-containing gas supply passage 30*a* for supplying an oxygen-containing gas, a coolant supply passage 32*a* for supplying a coolant, and a fuel gas discharge passage 34*b* for discharging, e.g., a hydrogen-containing gas are arranged in a vertical direction indicated by an arrow C. The oxygen-containing gas supply passage 30*a*, the coolant supply passage 32*a*, and the fuel gas discharge passage 34*b* extend through the fuel cell 12 in the stacking direction indicated by the arrow A.

At the other end of the fuel cell 12 in the direction indicated by the arrow B, a fuel gas supply passage 34*a* for supplying the fuel gas, a coolant discharge passage 32*b* for discharging the coolant, and an oxygen-containing gas discharge passage 30*b* for discharging the oxygen-containing gas discharge passage 30*b* are arranged in the direction indicated by the arrow C. The fuel gas supply passage 34*a*, the coolant discharge passage 32*b*, and the oxygen-containing gas discharge passage 30*b* extend through the fuel cell 12 in the direction indicated by the arrow A.

The second separator 16 has an oxygen-containing gas flow field 36 on its surface 16*a* facing the membrane electrode assembly 10. The oxygen-containing gas flow field 36 is connected to the oxygen-containing gas supply passage 30*a* and the oxygen-containing gas discharge passage 30*b*.

The first separator 14 has a fuel gas flow field 38 on its surface 14*a* facing the membrane electrode assembly 10. The fuel gas flow field 38 is connected to the fuel gas supply passage 34*a* and the fuel gas discharge passage 34*b*. A coolant flow field 40 is formed between a surface 14*b* of the first separator 14 and a surface 16*b* of the second separator 16. The coolant flow field 40 is connected to the coolant supply passage 32*a* and the coolant discharge passage 32*b*.

As shown in FIGS. 1 and 2, a first seal member 42 is formed integrally with the surfaces 14*a*, 14*b* of the first separator 14, around the outer end of the first separator 14. A second seal member 44 is formed integrally with the surfaces 16*a*, 16*b* of the second separator 16, around the outer end of the second separator 16.

As shown in FIG. 2, the first seal member 42 includes a first ridge seal 42*a* which contacts the inner extension 24*a* of the resin frame member 24 of the membrane electrode assembly 10, and a second ridge seal 42*b* which contacts the second seal member 44 of the second separator 16. The second seal member 44 functions as a flat seal having a flat surface which contacts the second ridge seal 42*b*. Instead of providing the second ridge seal 42b, the second seal member 44 may have a ridge seal (not shown).

Each of the first seal member 42 and the second seal members 44 is made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 1, the first separator 14 has supply holes 46 connecting the fuel gas supply passage 34a to the fuel gas flow field 38, and discharge holes 48 connecting the fuel gas flow field 38 to the fuel gas discharge passage 34b.

Next, a method of producing the membrane electrode assembly 10 will be described below.

Firstly, an MEA structure unit 10a having different sizes of MEA components (stepped MEA) is produced. Specifically, binder solution is added to mixture of catalyst and solvent to produce an electrode ink having a predetermined ink viscosity by mixing. The electrode ink is coated on a PET sheet of a PET film by screen printing to form an electrode sheet. Then, the solid polymer electrolyte membrane 18 is interposed between a pair of the electrode sheets, and hot pressing is applied to these components.

Figure 4:
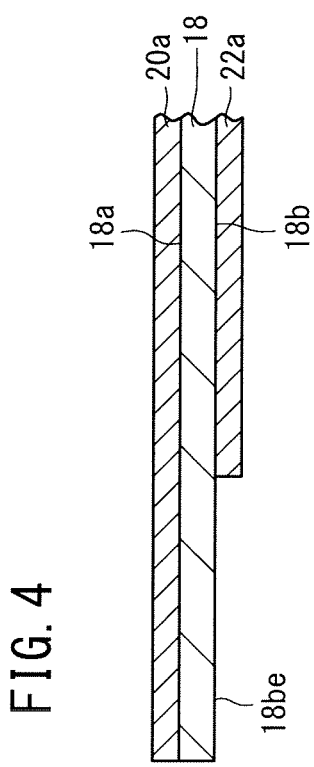
FIG. 4 is a view illustrating a method of producing the membrane electrode assembly.

Thereafter, by peeling off the PET sheets, as shown in FIG. 4, the first electrode catalyst layer 20a and the second electrode catalyst layer 22a are formed on the surfaces 18a, 18b of the solid polymer electrolyte membrane 18, respectively.

Figure 5:
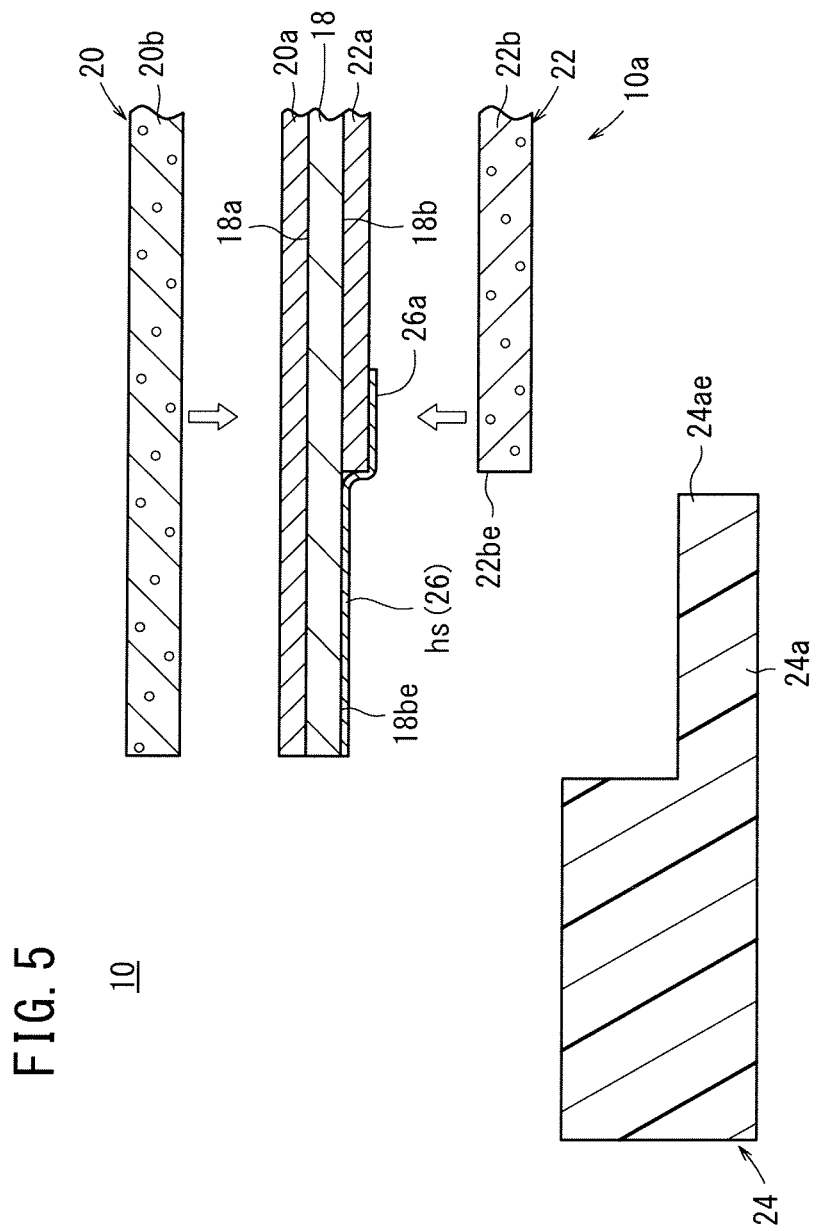
FIG. 5 is a view illustrating a method of producing the membrane electrode assembly.

Further, in a step of producing the first gas diffusion layer 20b and the second gas diffusion layer 22b, slurry is produced by dispersing mixture containing carbon black and PTFE (polytetrafluoroethylene) particles uniformly into ethylene glycol. This slurry is coated on carbon paper, and dried to produce the first gas diffusion layer 20b and the second gas diffusion layer 22b each having the carbon paper and an intermediate layer (see FIG. 5).

Next, the adhesive layer 26 is provided to cover an area from the outer marginal portion 18be of the solid polymer electrolyte membrane 18 to the outer marginal portion of the second electrode catalyst layer 22a. For example, a hot melt sheet hs as a heat adhesive sheet is formed in a frame shape in correspondence with the shape of the adhesive layer 26. Thereafter, the hot melt sheet hs is placed on the outer marginal portion 18be of the solid polymer electrolyte membrane 18.

The intermediate layer side of the first gas diffusion layer 20b is placed adjacent to the surface 18a of the solid polymer electrolyte membrane 18, i.e., placed on the first electrode catalyst layer 20a. The intermediate layer side of the second gas diffusion layer 22b is placed adjacent to the surface 18b of the solid polymer electrolyte membrane 18, i.e., placed on the second electrode catalyst layer 22a. These components are stacked together, and subjected to hot pressing to produce the MEA structure unit 10a.

Figure 6:
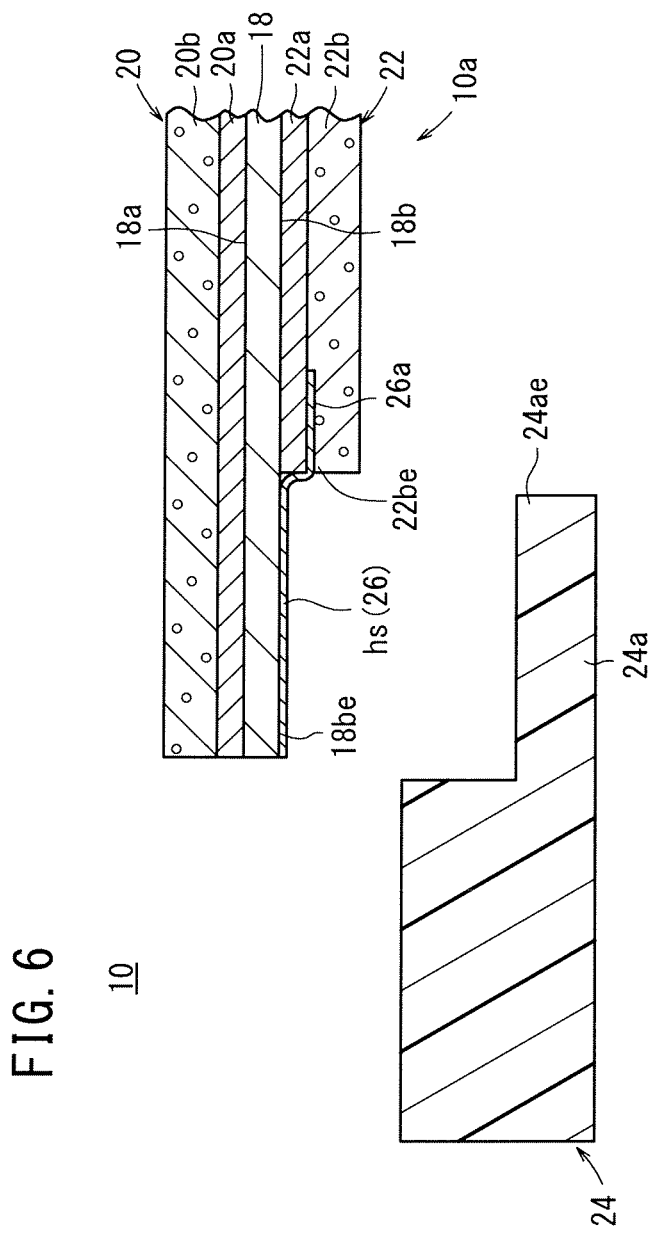
FIG. 6 is a view illustrating a method of producing the membrane electrode assembly.
Figure 7:
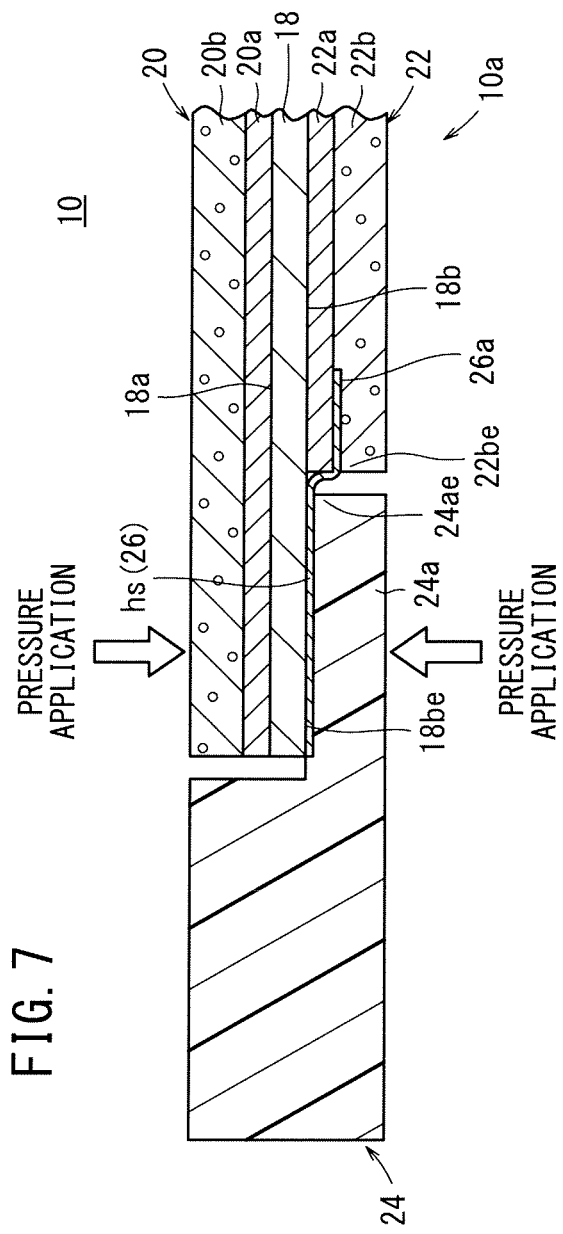
FIG. 7 is a view illustrating a method of producing the membrane electrode assembly.

In the meanwhile, the resin frame member 24 is formed beforehand by injection molding using dies (not shown). As shown in FIG. 6, the MEA structure unit 10a is positioned on the inner extension 24a of the resin frame member 24. In this state, hot pressing is applied to the hot melt sheet hs. Thus, the hot melt sheet hs is melted to form the adhesive layer 26. The MEA structure unit 10a and the resin frame member 24 are adhered to each other, and the membrane electrode assembly 10 is obtained (see FIG. 7).

As shown in FIG. 2, the membrane electrode assembly 10 is sandwiched between the first separator 14 and the second separator 16. The first separator 14 contacts the inner extension 24a of the resin frame member 24 so that a load can be applied from the first separator 14 and the second separator 16 to the membrane electrode assembly 10. Further, a predetermined number of fuel cells 12 are stacked together to form a fuel cell stack and a tightening load is applied to components between end plates (not shown).

Operation of the fuel cell 12 will be described below.

Firstly, as shown in FIG. 1, an oxygen-containing gas is supplied to the oxygen-containing gas supply passage 30a, and a fuel gas such as a hydrogen-containing gas is supplied to the fuel gas supply passage 34a. Further, coolant such as pure water, ethylene glycol, or oil is supplied to the coolant supply passage 32a.

Thus, the oxygen-containing gas flows from the oxygen-containing gas supply passage 30a to the oxygen-containing gas flow field 36 of the second separator 16. The oxygen-containing gas moves in the direction indicated by the arrow B, and the oxygen-containing gas is supplied to the cathode 20 of the MEA structure unit 10a for inducing an electrochemical reaction at the cathode 20. In the meanwhile, the fuel gas flows from the fuel gas supply passage 34a through the supply holes 46 into the fuel gas flow field 38 of the first separator 14. The fuel gas flows along the fuel gas flow field 38 in the direction indicated by the arrow B, and the fuel gas is supplied to the anode 22 of the MEA structure unit 10a for inducing an electrochemical reaction at the anode 22.

Thus, in each of the MEA structure units 10a, the oxygen-containing gas supplied to the cathode 20 and the fuel gas supplied to the anode 22 are partially consumed in the electrochemical reactions in the first electrode catalyst layer 20a and the second electrode catalyst layer 22a for generating electricity.

Then, the oxygen-containing gas partially consumed at the cathode 20 flows along the oxygen-containing gas discharge passage 30b, and the oxygen-containing gas is discharged in the direction indicated by the arrow A. Likewise, the fuel gas partially consumed at the anode 22 flows through the discharge holes 48. Then, the fuel gas flow along the fuel gas discharge passage 34b, and the fuel gas is discharged in the direction indicated by the arrow A.

Further, the coolant supplied to the coolant supply passage 32a flows into the coolant flow field 40 between the first separator 14 and the second separator 16. Then, the coolant flows in the direction indicated by the arrow B. After the coolant cools the MEA structure unit 10a, the coolant is discharged into the coolant discharge passage 32b.

In the first embodiment, as shown in FIG. 2, the adhesive layer 26 as a cushioning member is provided between the outer marginal portion 18be of the solid polymer electrolyte membrane 18 and the inner extension 24a of the resin frame member 24. The adhesive layer 26 extends over the area from the inner extension 24a to the outer marginal end of the second electrode catalyst layer 22a.

In the structure, an inner corner 24ae of the inner extension 24a of the resin frame member 24 and an outer end corner 22be of the second gas diffusion layer 22b do not directly contact the surface 18b of the solid polymer electrolyte membrane 18. Therefore, when the components of the membrane electrode assembly 10 are assembled together, and when a load is applied to the membrane electrode assemblies 10 during operation of the fuel cell 12, the inner corner 24ae of the inner extension 24a and the outer end corner 22be of the second gas diffusion layer 22b are not pushed into the solid polymer electrolyte membrane 18.

Thus, in the first embodiment, with the simple and economical structure only using the adhesive layer 26, it becomes possible to suitably suppress damages of the solid polymer electrolyte membrane 18.

Further, the adhesive layer 26 includes the overlapped portion 26a which is overlapped on the outer marginal portion of the second gas diffusion layer 22b of the anode 22, and the overlapped portion 26a is provided between the second gas diffusion layer 22b and the second electrode catalyst layer 22a. In the structure, diffusion of the reactant gas to the end of the anode 22 is suppressed suitably, and sufficient gas barrier performance is obtained. Accordingly, it becomes possible to prevent the electrode degradation.

Further, when the components of the membrane electrode assembly 10 are heated and joined together, the adhesive layer 26 is softer than the solid polymer electrolyte membrane 18. Thus, when the components of the membrane electrode assembly 10 are heated and joined together, the adhesive layer 26 is deformed, and it becomes possible to suppress reduction in the thickness of the solid polymer electrolyte membrane 18. Further, the thickness of the adhesive layer 26 is larger than the thickness of the second electrode catalyst layer 22a by 10 μm or more. In the structure, when the components of the membrane electrode assembly 10 are heated and joined together, it is possible to suppress reduction in the thickness of the solid polymer electrolyte membrane 18 which may be caused by the other components pushed into the solid polymer electrolyte membrane 18.

Figure 8:
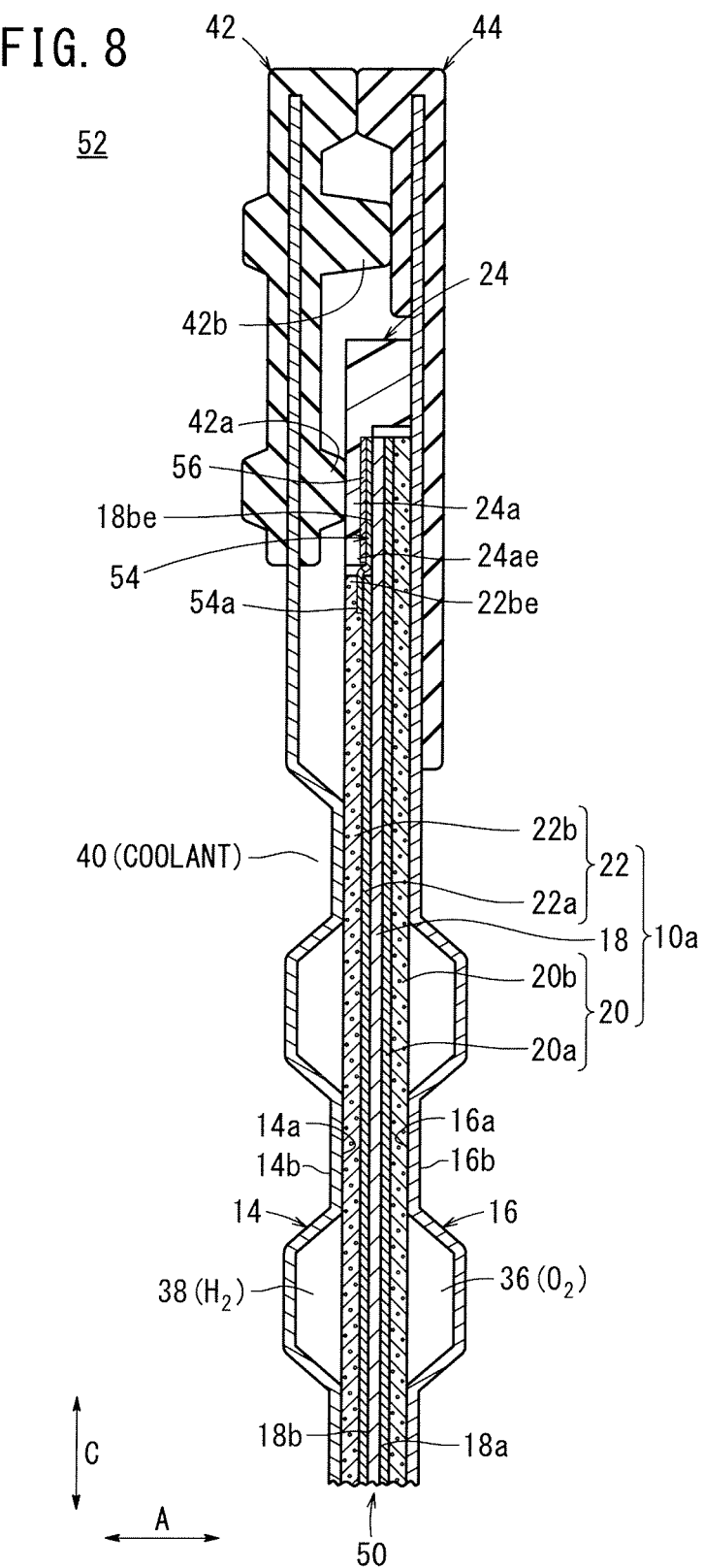
FIG. 8 is a cross sectional view showing main components of a solid polymer electrolyte membrane including a membrane electrode assembly according to a second embodiment of the present invention.

FIG. 8 is a cross sectional view showing main components of a solid polymer electrolyte fuel cell 52 including a membrane electrode assembly 50 according to a second embodiment of the present invention. The constituent elements that are identical to those of the membrane electrode assembly 10 and the fuel cell 12 according to the first embodiment are labeled with the same reference numerals, and descriptions thereof will be omitted. Further, also in third to sixth embodiments as described later, the constituent elements that are identical to those of the membrane electrode assembly 10 and the fuel cell 12 according to the first embodiment are labeled with the same reference numerals, and descriptions thereof will be omitted.

In the membrane electrode assembly 50, as a cushioning member, for example, a cushion layer 54 is provided between the outer marginal portion 18be of the solid polymer electrolyte membrane 18 and the inner extension 24a of the resin frame member 24. For example, the cushion layer 54 is made of PFTF (polytetrafluoroethylene), EPDM (ethylene propylene diene monomer) rubber (or ethylene propylene rubber), PE (polyethylene), PVDF (polyvinylidene fluoride), or PP (polypropylene) in the form of a sheet, or made of a mixture material obtained by mixing adhesive with any of these materials. For example, as the adhesive, epoxy based adhesive, acrylic based adhesive, urethane based adhesive, olefin based adhesive, silicone based adhesive, or the like is used. Preferably, any of these adhesives is semi-hardened, and subjected to shape forming into a sheet. Preferably, the cushion layer 54 has electric insulating capability.

The cushion layer 54 has a frame shape, and includes an overlapped portion 54a which is overlapped on the outer marginal end of the second gas diffusion layer 22b of the anode 22 (portion where the cushion layer 54 and the outer marginal end of the second gas diffusion layer 22b are overlapped in the stacking direction). The overlapped portion 54a is provided between the second gas diffusion layer 22b and the second electrode catalyst layer 22a. In particular, in the case where the cushion layer 54 is in the form of a sheet, an adhesive layer 56 is provided between the resin frame member 24 and the cushion layer 54.

In the second embodiment, the inner corner 24ae of the inner extension 24a of the resin frame member 24 and the outer end corner 22be of the second gas diffusion layer 22b do not directly contact the surface 18b of the solid polymer electrolyte membrane 18. Thus, with the simple and economical structure only using the cushion layer 54, the same advantages as in the case of the first embodiment are obtained. For example, it becomes possible to suitably suppress damages of the solid polymer electrolyte membrane 18.

Figure 9:
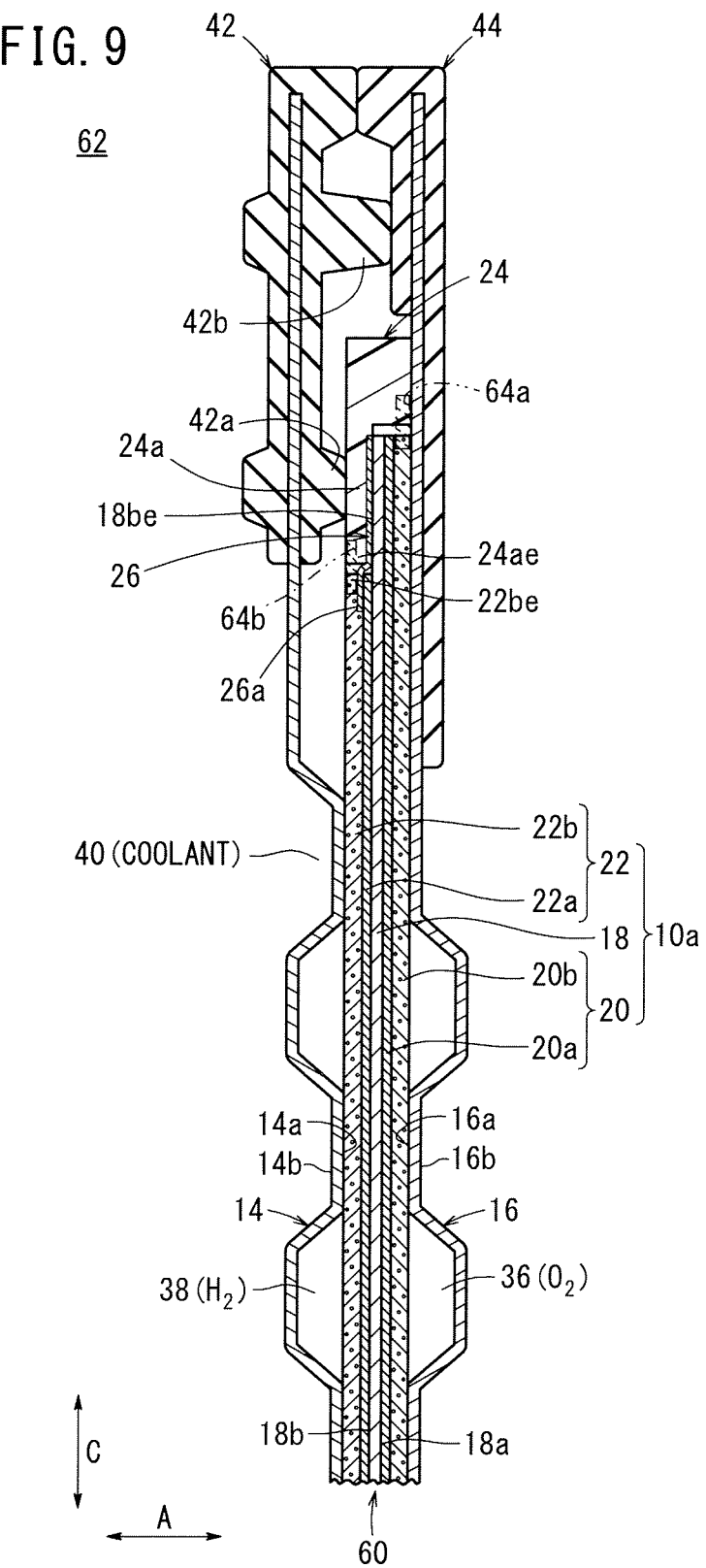
FIG. 9 is a cross sectional view showing main components of a solid polymer electrolyte membrane including a membrane electrode assembly according to a third embodiment of the present invention.

FIG. 9 is a cross sectional view showing main components of a solid polymer electrolyte fuel cell 62 including a membrane electrode assembly 60 according to a third embodiment of the present invention.

Figure 10:
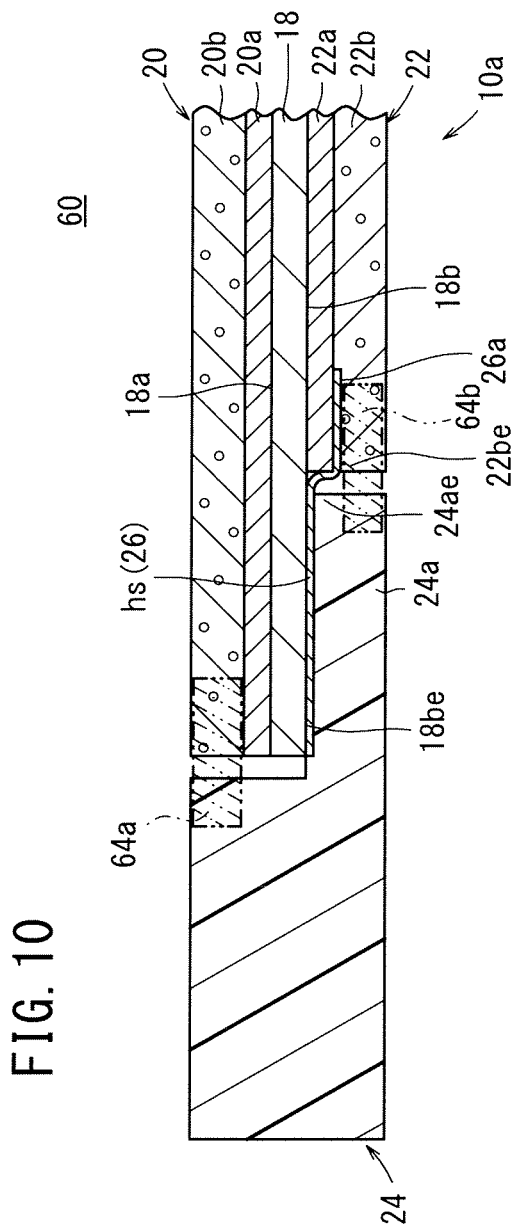
FIG. 10 is an enlarged cross sectional view showing main components of the membrane electrode assembly.

As shown in FIGS. 9 and 10, the resin frame member 24 and the first gas diffusion layer 20b of the cathode 20 are combined together by a resin impregnation portion 64a. Further, the resin frame member 24 and the second gas diffusion layer 22b of the anode 22 are combined together by a resin impregnation portion 64b.

The resin impregnation portion 64a is formed in a frame shape over the entire circumference of the first gas diffusion layer 20b of the cathode 20. The resin impregnation portion 64b is formed in a frame shape over the entire circumference of the second gas diffusion layer 22b of the anode 22. For example, the resin impregnation portions 64a, 64b are made of the same material or chiefly made of the same material as the resin frame member 24. The melting point of the resin impregnation portions 64a, 64b is higher than the melting point of the adhesive layer 26. Preferably, as the adhesive layer 26, olefin based thermoplastic resin, ester based thermoplastic resin, urethane based thermoplastic resin, acrylic based thermoplastic resin, or hot melt adhesive is used.

The resin impregnation portions 64a, 64b may comprise protrusions formed integrally with the resin frame member 24 to protrude outward in the stacking direction.

Next, a method of producing the membrane electrode assembly 60 will be described schematically below.

In the same manner as in the case of the first embodiment, firstly, after the MEA structure unit 10a having different sizes of components is produced, the MEA structure unit 10a is adhered to the resin frame member 24 through the adhesive layer 26.

Figure 11:
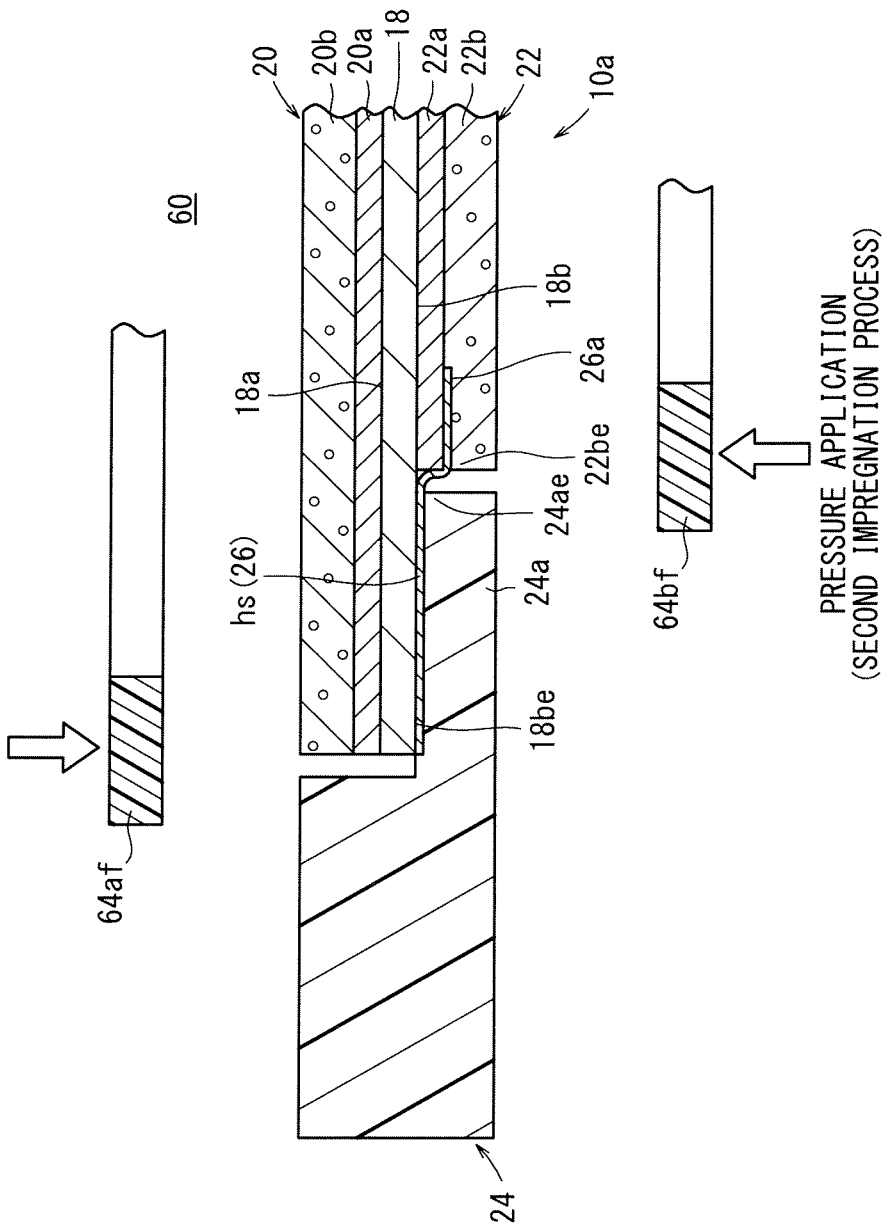
FIG. 11 is a view illustrating a method of producing the membrane electrode assembly.

Further, as shown in FIG. 11, a frame shaped resin member 64af for forming the resin impregnation portion 64a is prepared on the cathode 20 side. Then, in the state where the frame shaped resin member 64af is provided to cover the MEA structure unit 10a and the resin frame member 24, and a load is applied to the MEA structure unit 10a and the resin frame member 24 thereby, the frame shaped resin member 64af is heated (first impregnation process). As a heating method, any of laser welding, infrared welding, and impulse welding is adopted.

Thus, the frame shaped resin member 64af is melted by heating, and, both of the first gas diffusion layer 20b of the cathode 20 and the resin frame member 24 are impregnated with the melted resin of the frame shaped resin member 64af.

In this regard, the melting point of the frame shaped resin member 64af is higher than the melting point of the adhesive layer 26. Thus, by impregnation with the melted resin of the frame shaped resin member 64af, and melting (softening) of the adhesive layer 26, no undesirable stress is generated through the adhesive layer 26. Therefore, the resin impregnation portion 64a suitably impregnated with the melted resin of the frame shaped resin member 64af is obtained.

Next, a frame shaped resin member 64bf for forming the resin impregnation portion 64b is prepared on the anode 22 side. Then, in the state where the frame shaped resin member 64bf is provided to cover the MEA structure unit 10a and the resin frame member 24, and a load is applied to the MEA structure unit 10a and the resin frame member 24 thereby, the frame shaped resin member 64bf is heated (second impregnation process). As a heating method, any of laser welding, infrared welding, electric heat welding, impulse welding, etc. is adopted.

Thus, the frame shaped resin member 64bf is melted by heating, and both of the second gas diffusion layer 22b of the anode 22 and the resin frame member 24 are impregnated with the melted resin of the frame shaped resin member 64bf.

In this regard, the melting point of the frame shaped resin member 64bf is higher than the melting point of the adhesive layer 26. Thus, by impregnation with the melted resin of the frame shaped resin member 64bf, and melting (softening) of the adhesive layer 26, no undesirable stress is generated through the adhesive layer 26. Therefore, the resin impregnation portion 64b suitably impregnated with the melted resin of the frame shaped resin member 64bf is obtained.

Figure 12:
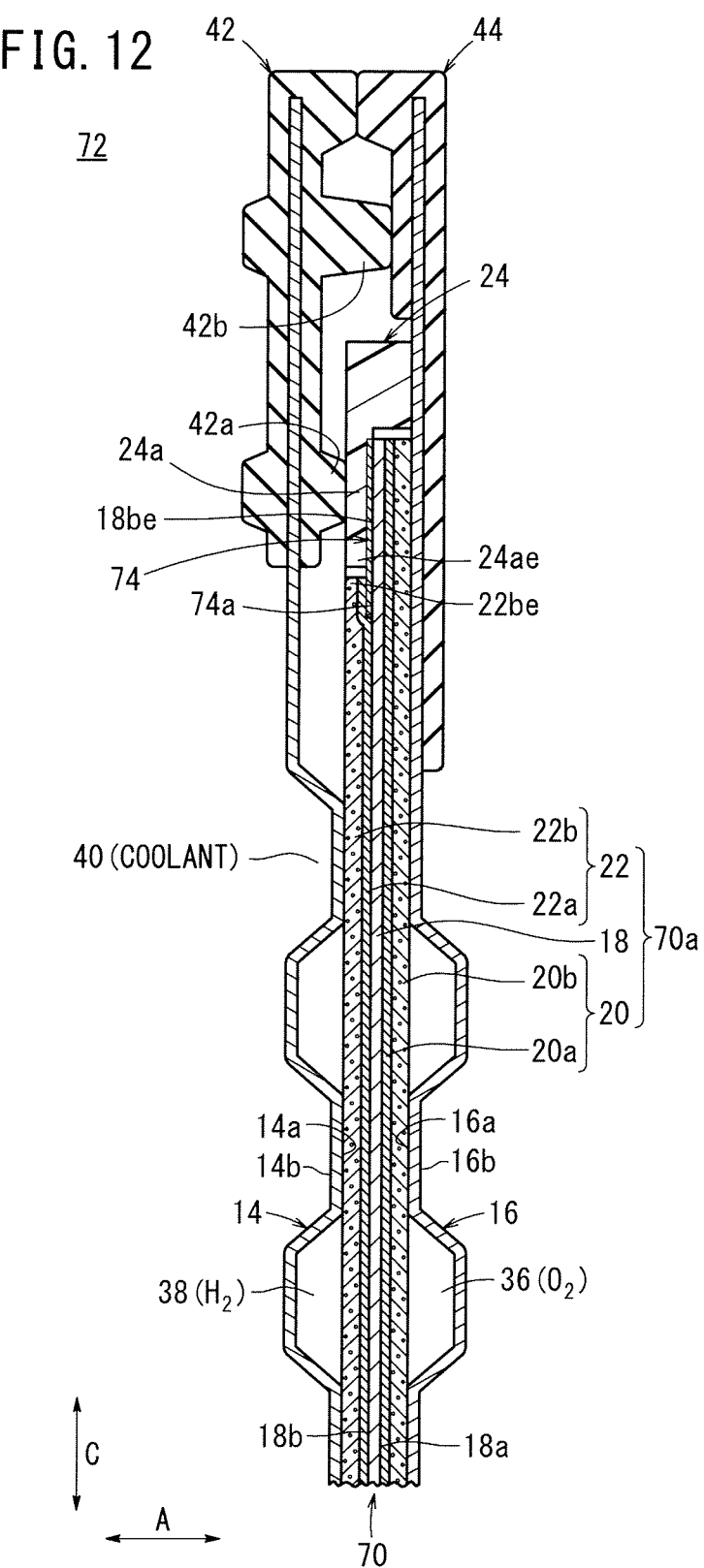
FIG. 12 is a cross sectional view showing main components of a solid polymer electrolyte membrane including a membrane electrode assembly according to a fourth embodiment of the present invention.
Figure 13:
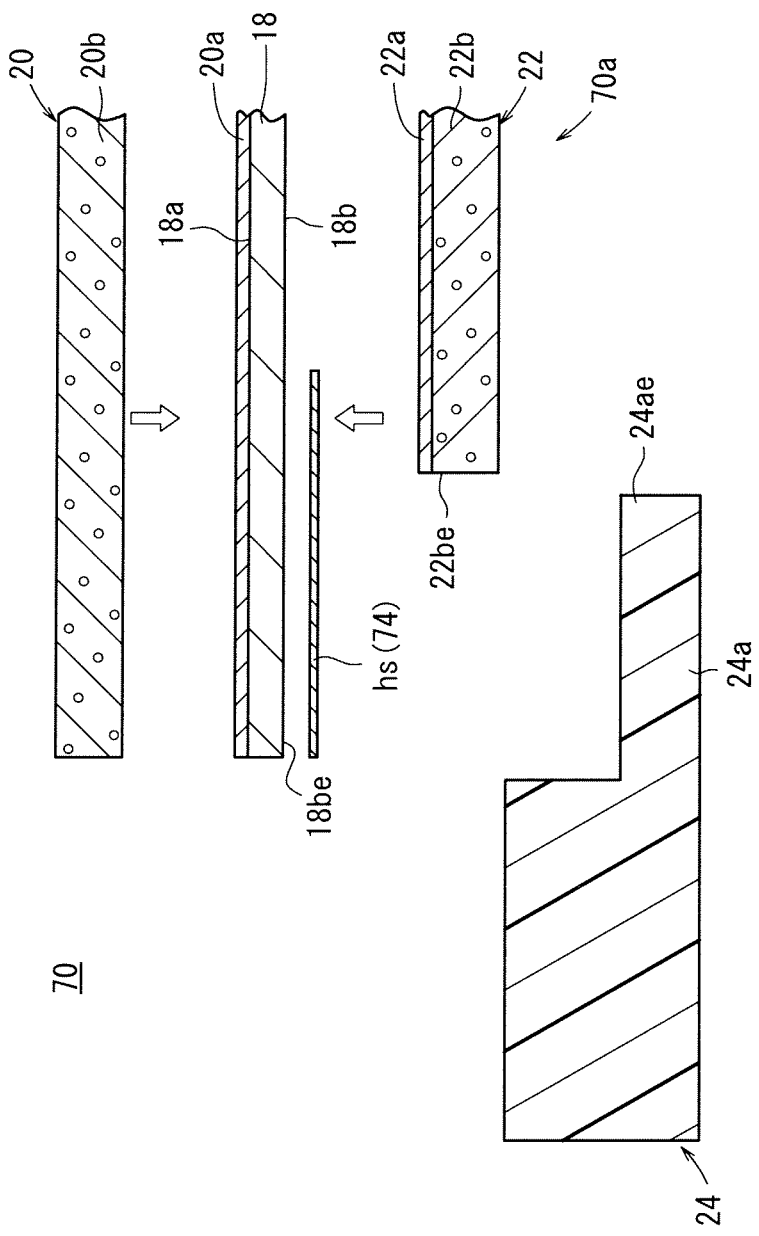
FIG. 13 is a view illustrating a method of producing the membrane electrode assembly.

FIG. 12 is a cross sectional view showing main components of a solid polymer electrolyte fuel cell 72 including a membrane electrode assembly 70 according to a fourth embodiment of the present invention.

As a cushioning member, for example, an adhesive layer 74 is provided between the outer marginal portion 18be of the solid polymer electrolyte membrane 18 and the inner extension 24a of the resin frame member 24. The adhesive layer 74 includes an overlapped portion 74a which is overlapped on the outer marginal ends of the second gas diffusion layer 22b and the second electrode catalyst layer 22a of the anode 22 (portion where the adhesive layer 74 and the outer marginal ends of the second gas diffusion layer 22b and the second electrode catalyst layer 22a are overlapped together in the stacking direction). The overlapped portion 74a is provided between the solid polymer electrolyte membrane 18 and the second electrode catalyst layer 22a.

Next, a method of producing the membrane electrode assembly 70 will be described below briefly.

Firstly, after the first electrode catalyst layer 20a is formed on the surface 18a of the solid polymer electrolyte membrane 18, the first gas diffusion layer 20b is provided on the first electrode catalyst layer 20a.

A hot melt sheet hs is placed on the surface 18b of the solid polymer electrolyte membrane 18. Further, a second electrode catalyst layer 22a and a second gas diffusion layer 22b are partially overlapped on the hot melt sheet hs. The second electrode catalyst layer 22a is formed on the second gas diffusion layer 22b beforehand. After these components are stacked together, hot pressing is applied to produce an MEA structure unit 70a.

Figure 14:
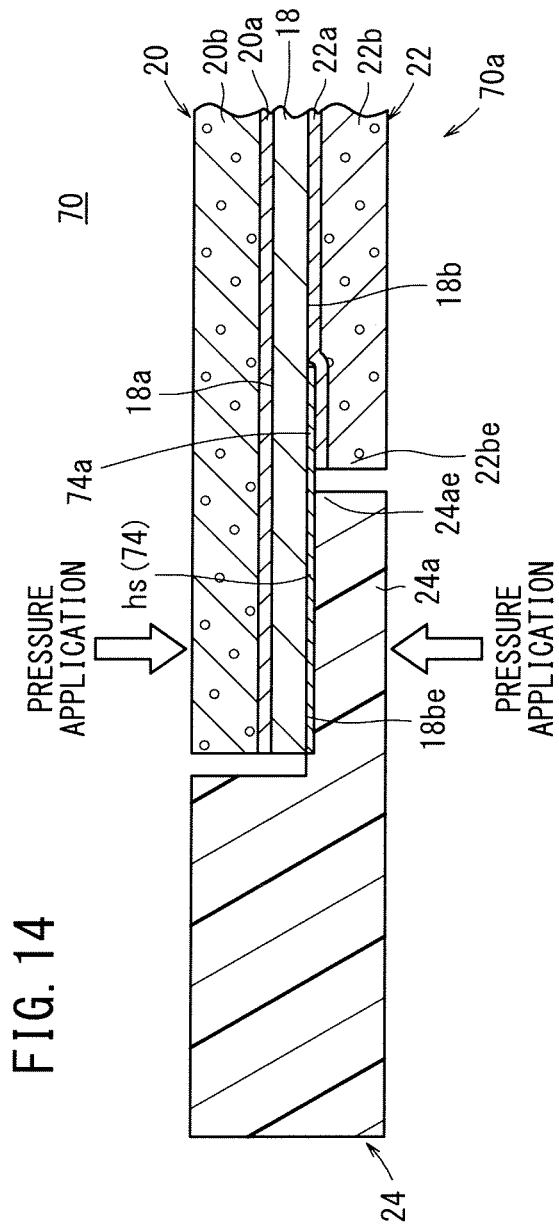
FIG. 14 is a view illustrating a method of producing the membrane electrode assembly.

Then, as shown in FIG. 14, the MEA structure unit 70a is positioned at the inner extension 24a of the resin frame member 24. In this state, hot pressing is applied. Thus, the hot melt sheet hs is melted to form the adhesive layer 74. The MEA structure unit 70a and the resin frame member 24 are adhered to each other, and the membrane electrode assembly 70 is obtained. In the fourth embodiment, the same advantages as in the case of the first to third embodiments are obtained.

Figure 15:
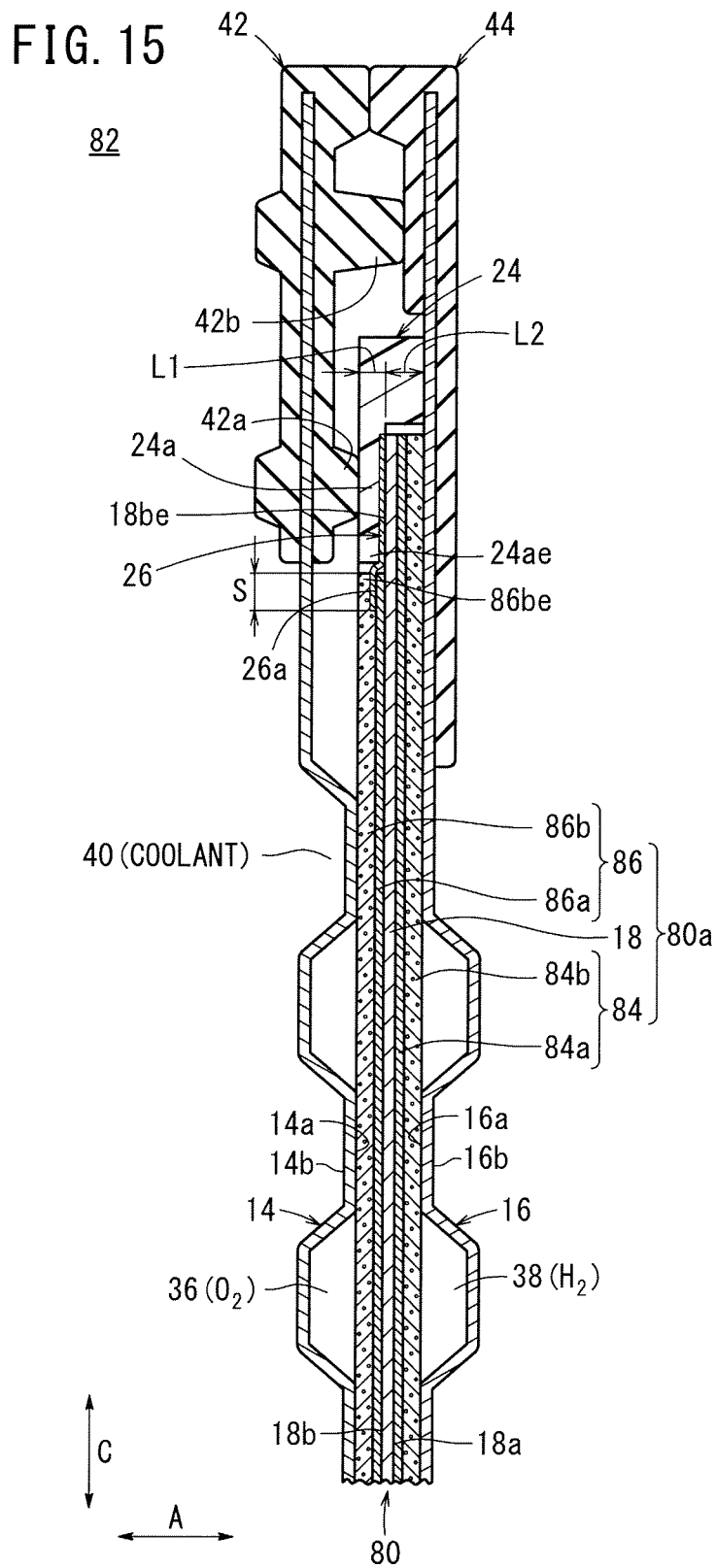
FIG. 15 is a cross sectional view showing main components of a solid polymer electrolyte fuel cell including a membrane electrode assembly according to a fifth embodiment of the present invention.

FIG. 15 is a cross sectional view showing main components of a solid polymer electrolyte fuel cell 82 including a membrane electrode assembly 80 according to a fifth embodiment of the present invention.

The membrane electrode assembly 80 includes an MEA structure unit 80a. The MEA structure unit 80a includes an anode (first electrode) 84, a cathode (second electrode) 86, and a solid polymer electrolyte membrane 18 interposed between the anode 84 and the cathode 86. The surface size (surface area) of the cathode 86 is smaller than the surface size of the solid polymer electrolyte membrane 18 and the surface size of the anode 84. That is, the relationship between the anode size and the cathode size (large or small) is contrary to the relationship shown between the anode size and the cathode size shown in FIG. 2 according to the first embodiment.

The anode 84 includes a first electrode catalyst layer (first catalyst layer) 84a joined to the surface 18a of the solid polymer electrolyte membrane 18 and a first gas diffusion layer 84b stacked on the first electrode catalyst layer 84a. The first electrode catalyst layer 84a and the first gas diffusion layer 84b have the same surface size. It should be noted that the surface size of the first electrode catalyst layer 84a may be smaller than the surface size of the first gas diffusion layer 84b.

The cathode 86 includes a second electrode catalyst layer (second catalyst layer) 86a joined to the surface 18b of the solid polymer electrolyte membrane 18 and a second gas diffusion layer 86b stacked on the second electrode catalyst layer 86a. The second electrode catalyst layer 86a and the second gas diffusion layer 86b have the same surface size. It should be noted that the surface size of the second electrode catalyst layer 86a may be smaller than, or larger than the surface size of the second gas diffusion layer 86b.

In the illustrated embodiment, the surface size of the first electrode catalyst layer 84a is larger than the surface size of the second electrode catalyst layer 86a. Alternatively, the first electrode catalyst layer 84a and the second electrode catalyst layer 86a may have the same surface size. The surface size of the first gas diffusion layer 84b is larger than the surface size of the second gas diffusion layer 86b.

In the fifth embodiment, the adhesive layer 26 includes an overlapped portion 26a overlapped on the outer marginal end of the second gas diffusion layer 86b of the cathode 86. The overlapped portion 26a is provided between the second gas diffusion layer 86b and the second electrode catalyst layer 86a.

In the structure, diffusion of the reactant gas to the end of the cathode 86 is suppressed suitably, and the desired gas barrier performance can be obtained. Therefore, it is possible to prevent the electrode degradation. In the fifth embodiment, the same MEA structure as in the case of the second to fourth embodiments may be adopted.

Figure 16:
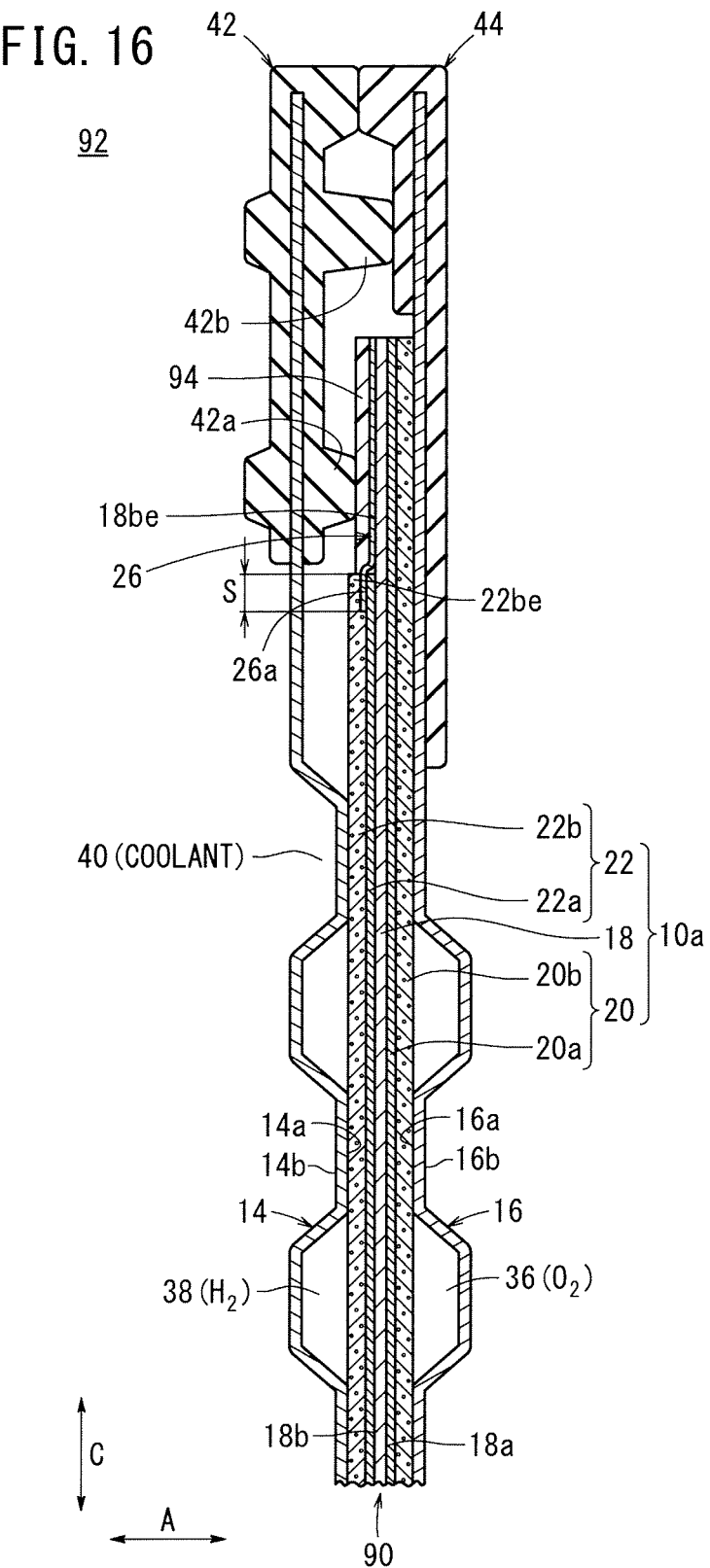
FIG. 16 is a cross sectional view showing main components of a solid polymer electrolyte fuel cell including a membrane electrode assembly according to a sixth embodiment of the present invention.
Figure 17:
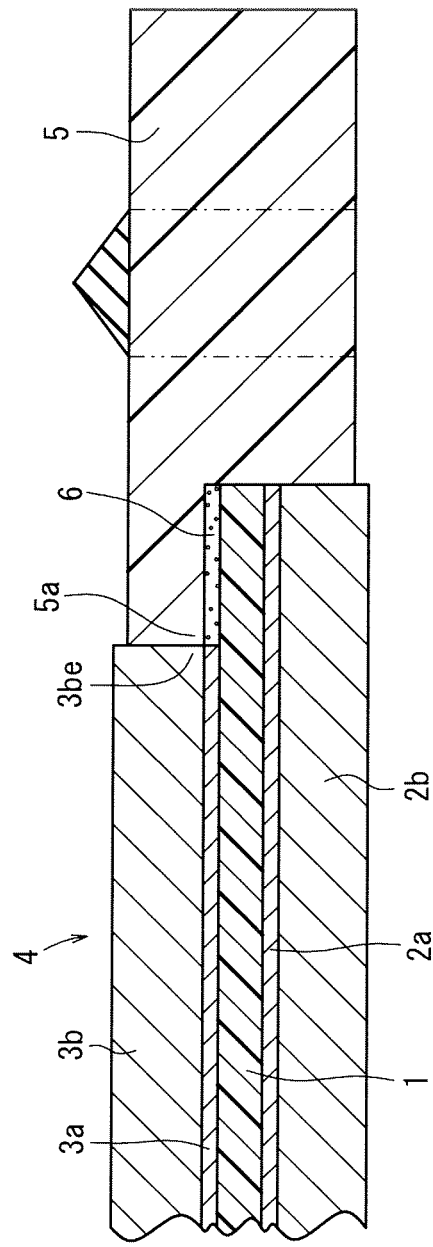
FIG. 17 is a view illustrating a membrane electrode assembly disclosed in the conventional technique 1.

FIG. 16 is a cross sectional view showing main components of a solid polymer electrolyte fuel cell 92 including a membrane electrode assembly 90 according to a sixth embodiment of the present invention.

The membrane electrode assembly 90 includes, e.g., an MEA structure unit 10a, and the MEA structure unit 10a has a protection member such as a protection film 94 around the outer marginal portion 18be of the solid polymer electrolyte membrane 18. Instead of the MEA structure unit 10a, the MEA structure unit 70a or the MEA structure unit 80a may be used.

The protection film 94 is adhered to the outer marginal portion 18be of the solid polymer electrolyte membrane 18 through the adhesive layer 26. For example, the protection film 94 is made of PPS (poly phenylene sulfide), PPA (polyphthalamide), PEN (polyethylene naphthalate), PES (polyethersulfone), LCP (liquid crystal polymer), PVDF (polyvinylidene fluoride), a silicone rubber, a fluoro rubber, or an EPDM (ethylene propylene diene monomer) rubber (or ethylene propylene rubber).

In the sixth embodiment, instead of the resin frame member 24, the protection film 94 can be adopted, and the same advantages as in the cases of the first to fifth embodiments are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell membrane electrode assembly, the membrane electrode assembly comprising:
   a solid polymer electrolyte membrane;
   a first electrode provided on one surface of the solid polymer electrolyte membrane, the first electrode including a first catalyst layer and a first gas diffusion layer; and
   a second electrode provided on another surface of the solid polymer electrolyte membrane, the second electrode including a second catalyst layer and a second gas diffusion layer,
   wherein:
   a surface size of the first gas diffusion layer is larger than a surface size of the second gas diffusion layer;
   a frame shaped protection member is formed around an outer marginal portion of the solid polymer electrolyte membrane extending outward beyond an outer end of the second gas diffusion layer;
   a cushioning member is provided between the outer marginal portion of the solid polymer electrolyte membrane and the protection member; the cushioning member comprising an inner portion and an outer portion extending from the inner portion;
   the cushioning member has an overlapped portion overlapped on an outer marginal end of the second gas diffusion layer;
   the inner portion of the cushioning member has the overlapped portion overlapped on the second catalyst layer;
   the outer portion is arranged in a stepped manner in relation to the inner portion;
   a thickness of the inner portion is substantially equal to a thickness of the outer portion;
   the cushioning member extends beyond an inner end of the frame shaped protection member toward a center of the solid polymer electrolyte membrane; and
   a thickness of the cushioning member is greater than a thickness of the second electrode catalyst layer by at least 10 μm.

2. The fuel cell membrane electrode assembly according to claim 1, wherein the cushioning member comprises an adhesive layer for joining the outer marginal portion of the solid polymer electrolyte membrane and the protection member together.

3. The fuel cell membrane electrode assembly according to claim 2, wherein the adhesive layer includes the overlapped portion overlapped on an intermediate layer interposed between the second catalyst layer and the second gas diffusion layer.

4. The fuel cell membrane electrode assembly according to claim 1, wherein the protection member comprises a resin frame member formed in a frame shape around the solid polymer electrolyte membrane and including a stepped portion to provide an outermost portion and an inner extension thinner than the outermost portion, the inner extension protruding toward the second gas diffusion layer; and
   the cushioning member is provided between the outer marginal portion of the solid polymer electrolyte membrane and the inner extension of the resin frame member.

5. The fuel cell membrane electrode assembly according to claim 4, wherein the first gas diffusion layer, the second gas diffusion layer, and the resin frame member are combined together through a resin impregnation portion; and
   a melting point of the resin impregnation portion is higher than a melting point of the cushioning member.

6. The fuel cell membrane electrode assembly according to claim 1, wherein the protection member comprises a protection film provided on the outer marginal portion of the solid polymer electrolyte membrane.

7. The fuel cell membrane electrode assembly according to claim 1, wherein the overlapped portion has a length of 0.2 mm to 3.0 mm.

8. The fuel cell membrane electrode assembly according to claim 1, wherein a thickness of the cushioning member is greater than a thickness of the second electrode catalyst layer by 10-150 μm.

* * * * *